US012486959B2

(12) United States Patent
Brinkmeier et al.

(10) Patent No.: US 12,486,959 B2
(45) Date of Patent: Dec. 2, 2025

(54) LIGHT MODULE FOR A LIGHTING DEVICE OF A VEHICLE

(71) Applicant: HELLA GMBH & CO. KGAA, Lippstadt (DE)

(72) Inventors: Frank Brinkmeier, Lippstadt (DE); Reinhard Dikau, Paderborn (DE); Alexander Musch, Lippstadt (DE); Thomas Wiese, Lippstadt (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 18/710,953

(22) PCT Filed: Nov. 14, 2022

(86) PCT No.: PCT/EP2022/081705

§ 371 (c)(1),
(2) Date: May 16, 2024

(87) PCT Pub. No.: WO2023/088815

PCT Pub. Date: May 25, 2023

(65) Prior Publication Data

US 2025/0012419 A1 Jan. 9, 2025

(30) Foreign Application Priority Data

Nov. 17, 2021 (DE) ......................... 102021129949.7

(51) Int. Cl.
*F21S 41/29* (2018.01)
*F21S 41/151* (2018.01)
(Continued)

(52) U.S. Cl.
CPC ............. *F21S 41/29* (2018.01); *F21S 41/151* (2018.01); *F21S 41/285* (2018.01); *F21S 45/47* (2018.01); *F21Y 2115/10* (2016.08)

(58) Field of Classification Search
CPC ........ F21S 41/151; F21S 41/285; F21S 45/47; F21S 41/29; F21S 41/295; F21Y 2115/10;
(Continued)

(56) References Cited

U.S. PATENT DOCUMENTS

2015/0377448 A1* 12/2015 Willeke .................. F21S 43/14
362/545

FOREIGN PATENT DOCUMENTS

CN 209926254 U 1/2020
DE 102007038787 A1 * 2/2009 ............... F21K 9/69
(Continued)

OTHER PUBLICATIONS

Search English translation of JP-2011081967-A (Year: 2011).*
Serach English translation of DE 102007038788 A1 (Year: 2009).*
Search English translation of DE 102007038787 A1 (Year: 2009).*

*Primary Examiner* — Omar Rojas Cadima
(74) *Attorney, Agent, or Firm* — WARNER NORCROSS + JUDD LLP

(57) ABSTRACT

The present invention relates to a light module for a lighting device of a vehicle, in particular for a headlight of a vehicle. The light module comprises a light-generating unit for emitting light, an optical unit for deforming the light emitted by the light-generating unit, and a heat sink for cooling the light-generating unit, the heat sink having a front side facing the optical unit and a rear side facing away from the optical unit, the light-generating unit being situated between the optical unit and the heat sink, the optical unit comprising at least one referencing means, and the heat sink having a recess that accommodates the referencing means on the front side facing the optical unit, and the recess being closed or substantially closed at the rear.

11 Claims, 6 Drawing Sheets

(51) Int. Cl.

| | |
|---|---|
| ***F21S 41/20*** | (2018.01) |
| ***F21S 45/47*** | (2018.01) |
| *F21Y 115/10* | (2016.01) |

(58) Field of Classification Search

CPC .... F21Y 2105/10; F21V 17/108; F21V 17/14; F21V 17/16; F21V 17/164; F21V 17/166; F21V 17/168; F21V 17/18; F21V 17/002; F21V 17/005; F21V 17/06; F21V 29/70; F21V 29/713; F21V 29/80; F21V 29/81; F21V 29/83

See application file for complete search history.

(56) References Cited

FOREIGN PATENT DOCUMENTS

| | | | | | |
|---|---|---|---|---|---|
| DE | 102007038788 | A1 * | 2/2009 | ............ F21V 17/164 |
| EP | 2966340 | A1 | 1/2016 | |
| JP | 2011081967 | A * | 4/2011 | ............ B60Q 1/143 |
| WO | 2014083122 | A1 | 6/2014 | |
| WO | 2022239814 | A | 11/2022 | |

* cited by examiner

LIGHT MODULE FOR A LIGHTING DEVICE OF A VEHICLE

CROSS-REFERENCE TO RELATED APPLICATIONS

This application is the National Stage of International Application No. PCT/EP2022/081705 filed on Nov. 14, 2022, which claims priority to and all advantages of German Patent Application No. 10 2021 129 949.7 filed on Nov. 17, 2021, the disclosures of which are hereby incorporated by reference in their entirety.

BACKGROUND

The present invention relates to a light module for a lighting device of a vehicle, in particular for a headlight of a vehicle.

These types of light modules for lighting devices of a vehicle are already known from the prior art in numerous variant embodiments. For example, DE 10 2019 106 504 A1 discloses a light module of a light unit of a vehicle, this light unit including a light-generating unit, an optical system, a cover plate, a cover frame, and a carrier.

It is known from practice that a light module for a lighting device of a vehicle comprises a light-generating unit for emitting light, an optical unit for deforming the light emitted by the light-generating unit, and a heat sink for cooling the light-generating unit. The heat sink has a front side facing the optical unit and a rear side facing away from the optical unit, the light-generating unit being situated between the optical unit and the heat sink. To allow generation of an optimal light image, particular importance is attached to the exact positioning of the light-generating unit in relation to the optical unit. For example, when LED light sources are used, which, for example, comprise one or more light-emitting diodes as light-emitting elements, the deviations from the target position of the optical unit in relation to the light-emitting diodes can only be in the range of fractions of a millimeter.

To ensure the optimal positioning of the optical unit in relation to the light-generating unit, the optical unit generally comprises one or more referencing means that cooperate with corresponding countermeans, so that an optimal orientation of the optical unit in relation to the light-generating unit is ensured when the referencing means cooperate with the corresponding countermeans.

The problem with such referencing means is that these referencing means are configured in such a way that, in the installed state, they generally protrude with respect to the light-generating unit in the direction of the heat sink to ensure simple and accurate adjustment, so that cavities that are used to accommodate the referencing means must be provided on the front side of the heat sink.

The problem with such cavities is that these cavities are generally designed as through openings that completely extend through the heat sink, that is, from the front side to the rear side. As a result, during operation of the light module, light emitted by the light-generating unit and entering the optical unit can exit in the region of the cavities on the rear side of the heat sink. Such radiation of light to the rear represents undesirable leakage of light which may result in undesirable scattered light, for example when light that is radiated to the rear is scattered or reflected on components located there, and becomes recognizable to the observer from the outside.

SUMMARY

The object of the present invention is to avoid such leakage of light. This object is achieved by the instant invention.

The light module according to the invention is a light module for a lighting device of a vehicle. The lighting device may be a headlight of a vehicle, for example. The light module comprises a light-generating unit, an optical unit, and a heat sink. The heat sink has a front side facing the optical unit and a rear side facing away from the optical unit, the light-generating unit being situated between the optical unit and the heat sink. The optical unit comprises at least one referencing means, and on the front side facing the optical unit, the heat sink has a recess that accommodates the referencing means, the recess being closed or substantially closed at the rear.

The recess is preferably completely closed at the rear, so that light which is generated by the light-generating unit and which enters the optical unit cannot exit from the heat sink in the region of the recesses at the rear. "Substantially closed" is understood in particular to mean that a cross-section of the recess in the region of the front side is larger than a cross section of the recess in the region of the rear side. Compared to a recess having a constant cross section as currently known from practice, the leakage of light at the rear is thus avoided. In this regard, it is considered advantageous when an substantially closed recess in the region of the rear side has an opening whose cross-sectional area is less than 10% of a cross-sectional area of front-side opening of the recess.

To achieve particularly good positioning, in one preferred embodiment it is provided that the optical unit comprises multiple referencing means, and the heat sink has multiple recesses that accommodate the referencing means, the respective recess being closed at the rear.

The referencing means are designed in particular as positioning pins and/or positioning pegs.

It is considered particularly advantageous when the particular referencing means is situated in the respective recess with play. It is considered particularly advantageous when the recess provided in the heat sink is not used to exactly position the optical unit, but only to accommodate the referencing means, the referencing means cooperating with a countermeans, preferably in a form-fit manner, and the exact positioning of the optical unit in relation to the light-generating unit being achieved via the cooperation of the referencing means with the corresponding countermeans. In this regard, it is considered particularly advantageous when the countermeans are provided in the light-generating unit, in particular in a circuit board of the light-generating unit, at which one or more LEDs, for example, are situated.

In one preferred embodiment of the light module, the particular recess is designed in the manner of a blind hole. "In the manner of a blind hole" is understood in particular to mean that the recess does not completely extent through the heat sink, so that the recess has not been closed by a separate component or separate material, but instead a base surface that closes off the recess at the rear is an integral part of the heat sink. The cover may also be formed, for example, by a component of a cooling fin mounted at the rear.

However, it is also conceivable for the recess to be covered by a cover plate that is mounted at the rear or a similar cover element, and to thus be closed at the rear.

The front side of the heat sink preferably has a flat or substantially flat design. The rear side of the heat sink may have cooling fins.

It is considered particularly advantageous when the particular recess has a cross-section that tapers in the direction of the rear side. Such tapering of the cross section has proven advantageous for any processes for producing the recess.

It is considered particularly advantageous when the particular recess has a cross-section that tapers in the direction of the rear side along one or more steps. Such a design has the advantage that the recess may be formed in a multistep process, for example a multistep stamping process.

In one particularly preferred embodiment, it is provided that the heat sink is designed as a cooling plate, or at least a front side of the heat sink is formed by a cooling plate. The use of a cooling plate on the front side of the heat sink has proven advantageous, on the one hand, with regard to the positioning of a light-generating unit that comprises a circuit board. On the other hand, a cooling plate configured in this way may be manufactured particularly easily and cost-effectively in a stamping process. The cooling plate preferably has a thickness of 1.5 to 5 mm. In particular, the cooling plate has a substantially flat front side and a substantially flat rear side, in one preferred embodiment it being possible for one or more cooling fins to be mounted at the rear side of the cooling plate. The cooling fins may be attached using, for example, a mechanical joining process based on forming technology.

It is conceivable for retaining structures in the form of through openings to be introduced into the heat sink, in particular into the cooling plate, the optical unit comprising retaining means that correspond to the retaining structures, in the installed position these retaining means engaging behind the heat sink on the rear side of the heat sink facing away from the front side. These retaining means may be designed in the form of spring arms, for example, which are deformed when the optical unit is pushed onto the heat sink, deforming the spring arms against a restoring force, and which after passing through the retaining structures, latchingly engage with the heat sink at the rear. The optical unit is thus mechanically connected to the heat sink. The optical unit may be removed again, if necessary, by deformation of the spring arms and subsequent pulling of the optical unit off the heat sink.

In one preferred embodiment, it is provided that a closed or substantially closed base that closes off the recess at the rear is an integral part of the heat sink or of the cooling plate. The base preferably has a thickness greater than or equal to 0.3 mm. The base preferably has a thickness greater than or equal to 0.3 mm and smaller than 2 mm.

It is considered advantageous when the base and a region surrounding the base form a flat area on the rear side of the heat sink, in particular of the cooling plate. In this regard, the base does not protrude at the rear side of the heat sink or of the cooling plate. As a result, the arrangement of further components, for example cooling fins, is not hindered or limited by the closed base.

It is conceivable for the recess which is closed at the rear to be formed by removing corresponding material from the heat sink or the cooling plate using a machining process, for example by drilling. However, it is considered particularly advantageous when the recess is produced using a chipless process, for example a stamping or shear cutting process and/or a forming process. It is conceivable for the recess to be produced in a multistep process, for example using a stamping process followed by a forming process.

It is considered particularly advantageous when the light-generating unit comprises a circuit board having at least one LED situated at the circuit board. The circuit board particularly preferably comprises one or more rows of LEDs. The LEDs or the LED light sources are preferably soldered to the circuit board. The light-generating unit is preferably designed as a printed circuit board assembly (PCBA), and thus as a populated circuit board.

Countermeans that cooperate with the referencing means are preferably provided at the light-generating unit. These countermeans may, for example, be through openings in a carrier plate of the light-generating unit. The countermeans may also be introduced directly into the circuit board. The countermeans may, for example, be through openings, in particular in the form of elongated holes. The countermeans, which are often referred to and used as reference positionings, may, for example, be drilled, milled, or produced in another manner, for example by use of laser cutting.

The countermeans or reference positionings are positioned or introduced in particular taking the position of the LED light source(s) into account.

The recesses in the heat sink used to accommodate the referencing means preferably directly adjoin the countermeans that cooperate with the referencing means.

The optical unit in particular is a primary optical unit. The light module preferably comprises a further optical unit, namely, a secondary optical unit.

It is conceivable for the optical unit to be formed by a component, this component comprising multiple optical units, and the particular optical unit being assigned to an LED of the light-generating unit.

The optical unit is preferably designed as a transmissive optical unit. However, it is also conceivable for the optical unit to be a reflective optical unit, for example in the form of a reflector.

It is considered particularly advantageous when the optical unit and/or the heat sink and/or the cooling plate have/has a one-piece design.

The optical unit is preferably made of a glass or a suitable plastic material.

The cooling plate and/or the heat sink are/is preferably made of a metal or a metal alloy, for example aluminum.

The light module may comprise further components; for example, the light module can comprise a secondary optical unit in the form of a cover plate, a cover frame, a housing, and/or a retaining frame. Further optical units in the form of diaphragms may be an integral part of the light module.

BRIEF DESCRIPTION OF DRAWINGS

In the figures described below, the invention is described in greater detail based on one exemplary embodiment, without being limited thereto.

In the drawings.

DETAILED DESCRIPTION

Figure 1:
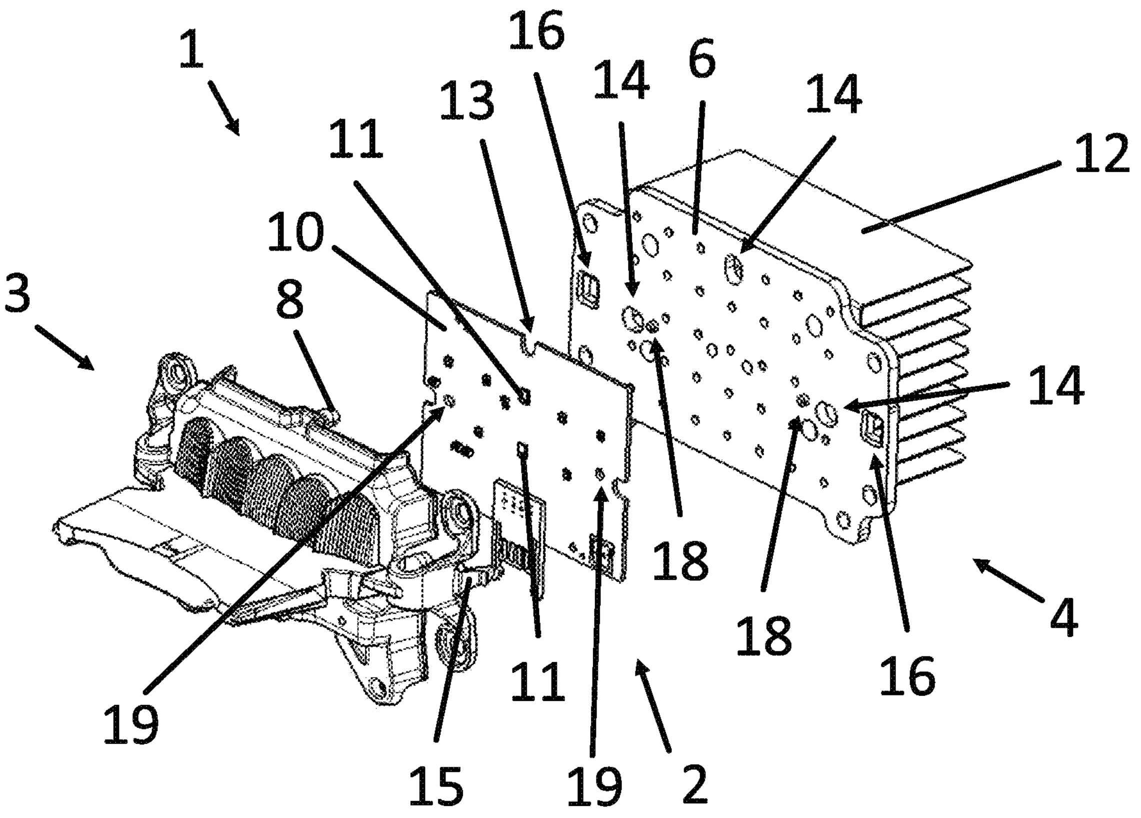
FIG. 1 shows a light module according to internal prior art, in an exploded illustration in an oblique view from the front.
Figure 2:
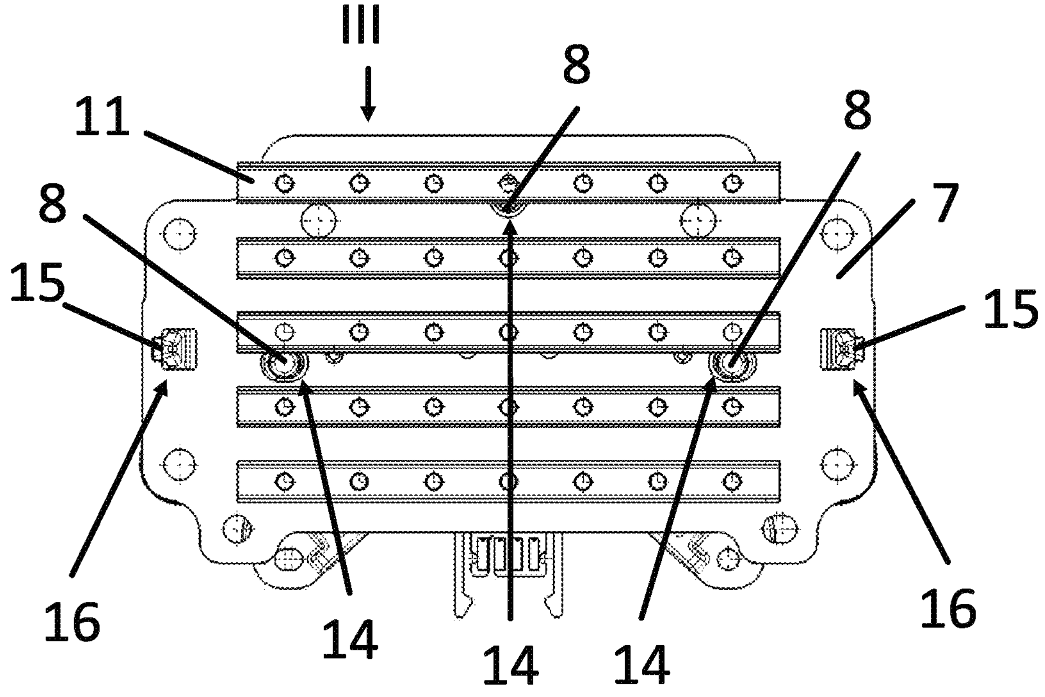
FIG. 2 shows the light module according to FIG. 1 in a rear view according to the arrow II in FIG. 3.
Figure 3:
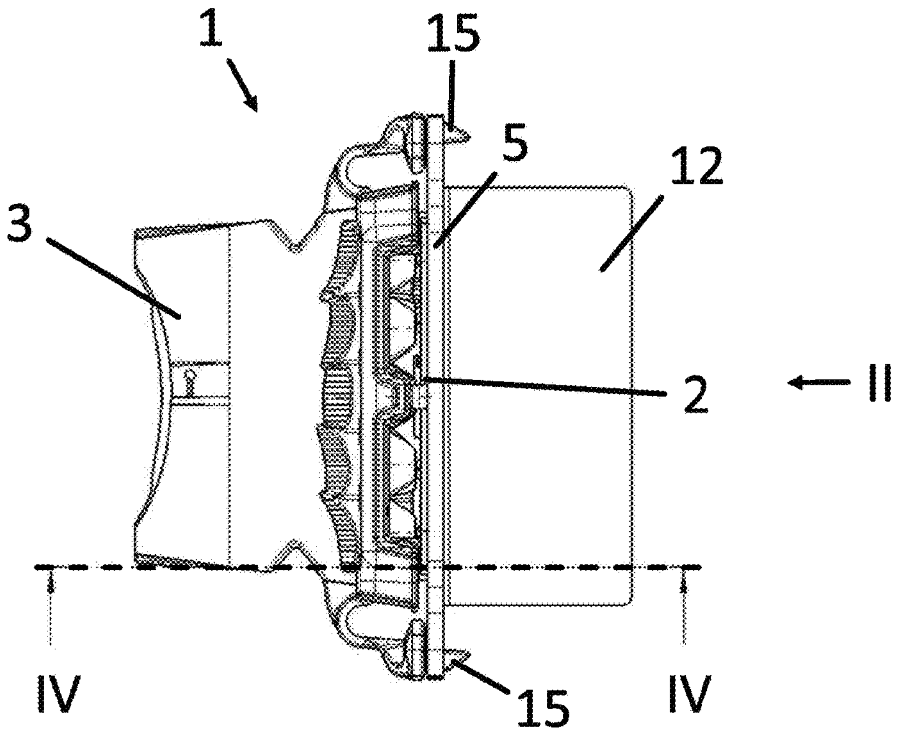
FIG. 3 shows the light module according to FIG. 1 in a view according to the arrow III in FIG. 2.
Figure 4:
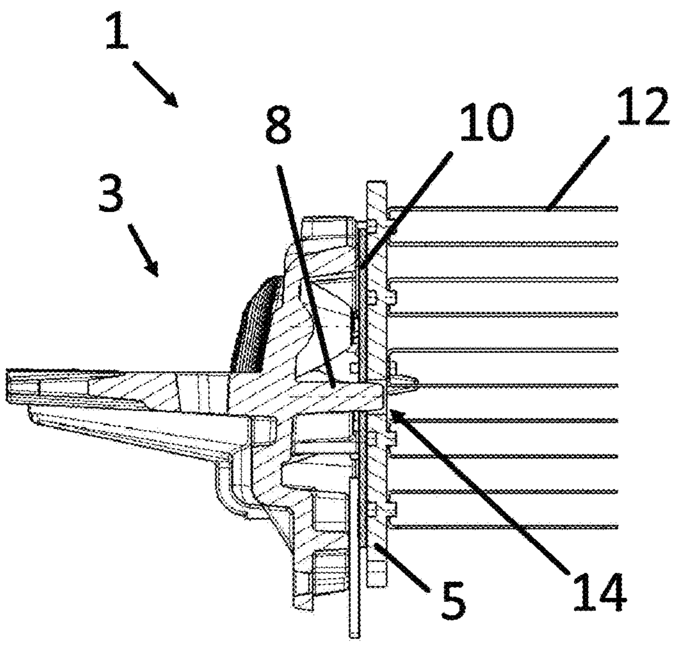
FIG. 4 shows the light module according to FIG. 1 in a sectional view according to the line IV-IV in FIG. 3.
Figure 5:
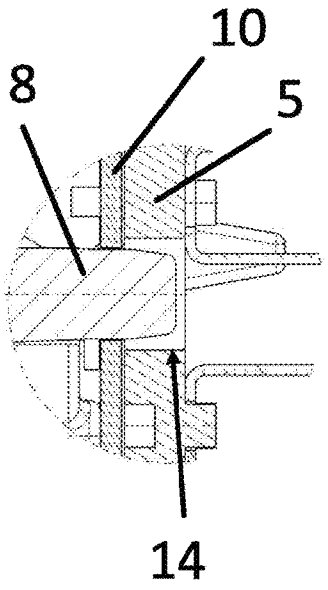
FIG. 5 shows a partial area from FIG. 4 in an enlarged illustration.
Figure 6:
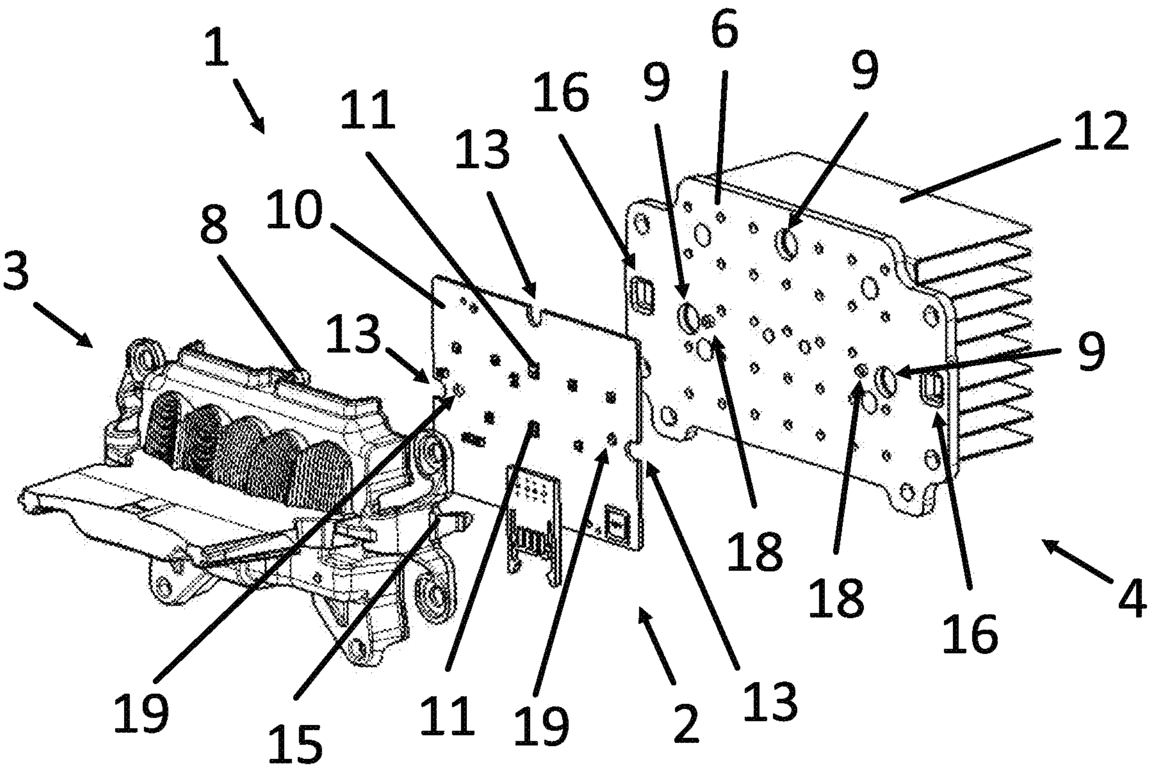
FIG. 6 shows one embodiment of the light module according to the invention, in an exploded illustration in an oblique view from the front.
Figure 7:
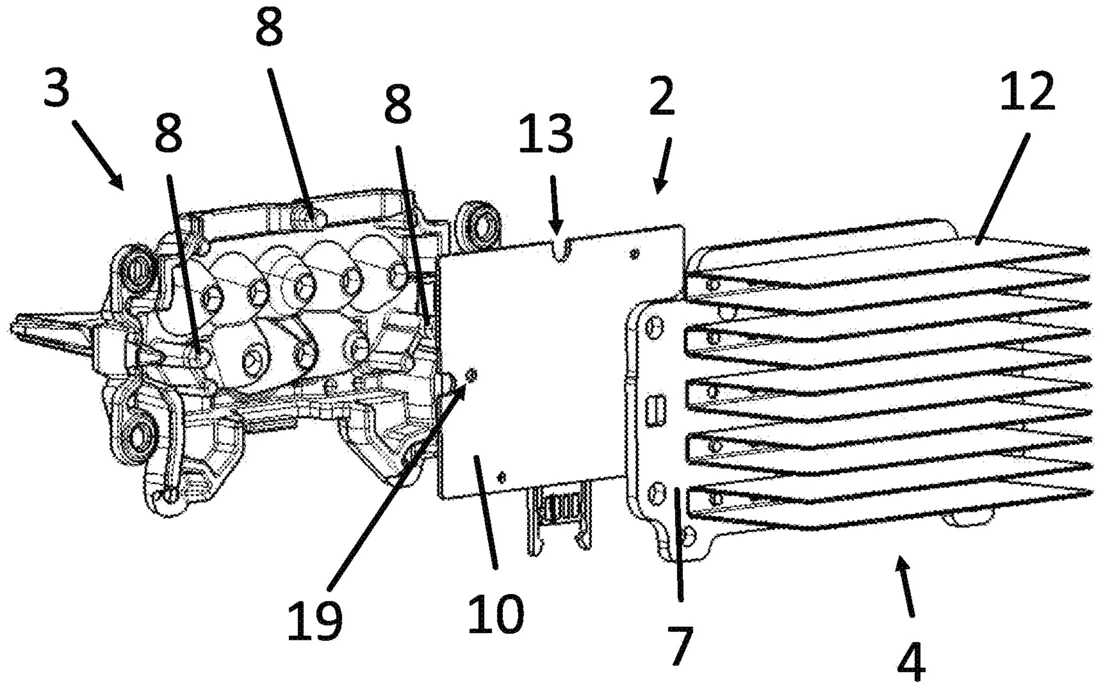
FIG. 7 shows the light module according to FIG. 6, in an exploded illustration in an oblique view from the rear.
Figure 8:
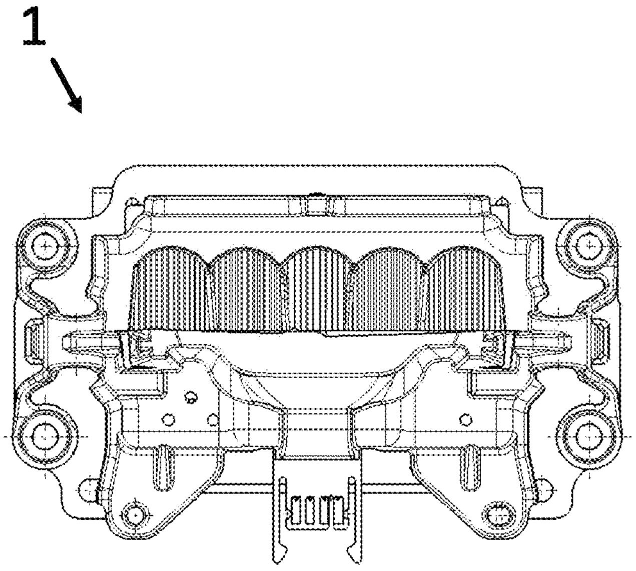
FIG. 8 shows the light module according to FIG. 6 in a view according to the arrow VIII in FIG. 10.
Figure 9:
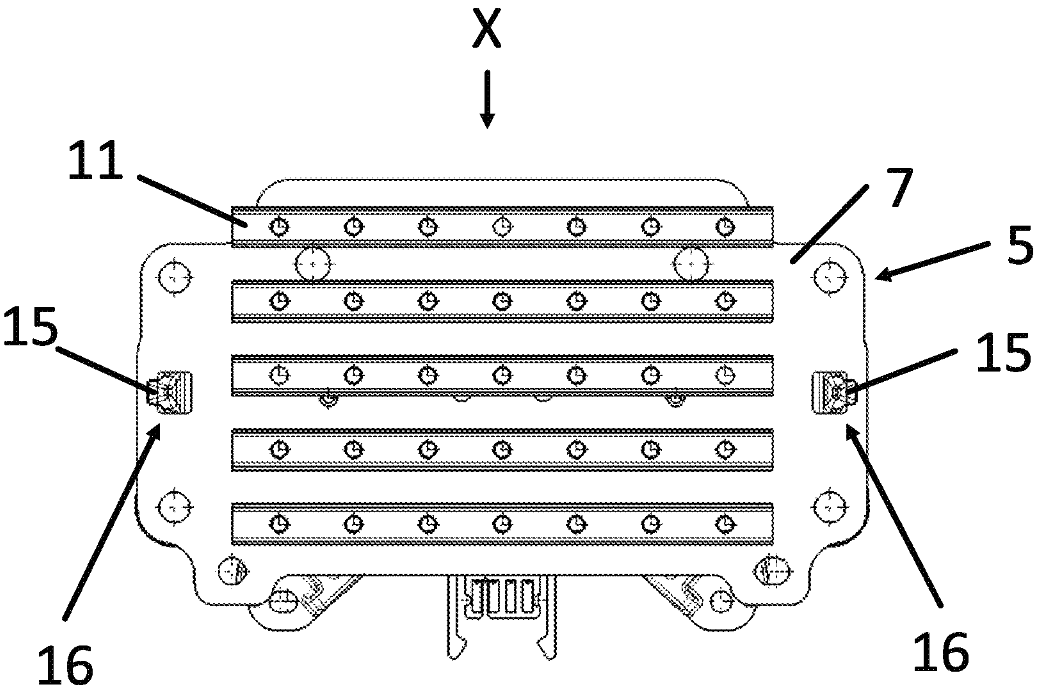
FIG. 9 shows the light module according to FIG. 6 in a view according to the arrow IX in FIG. 10.
Figure 10:
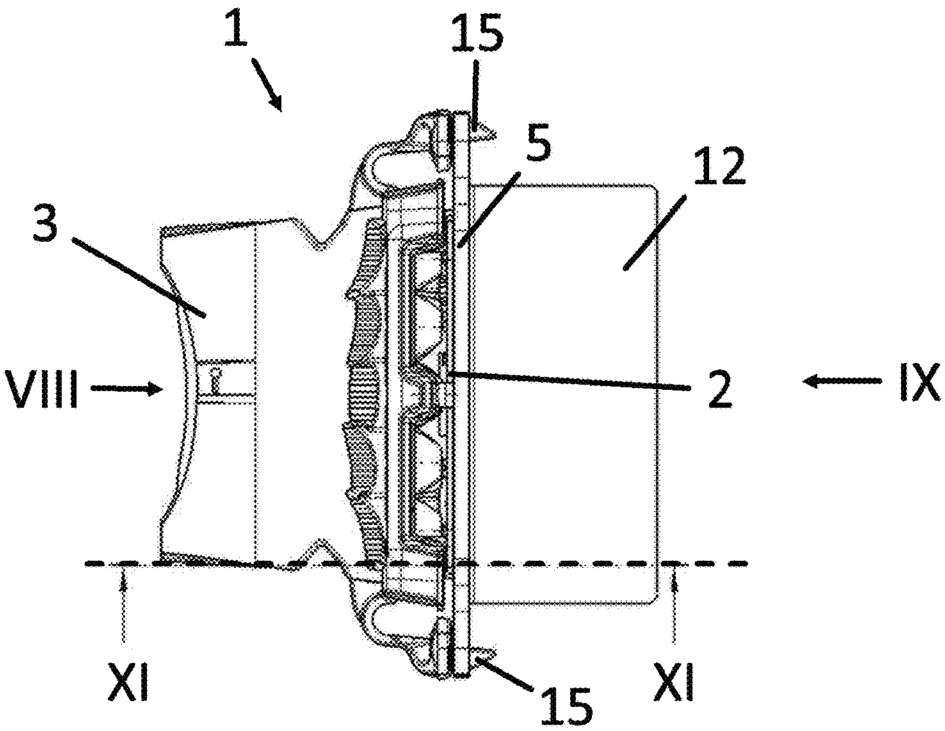
FIG. 10 shows the light module according to FIG. 6 in a view according to the arrow X in FIG. 9.
Figure 11:
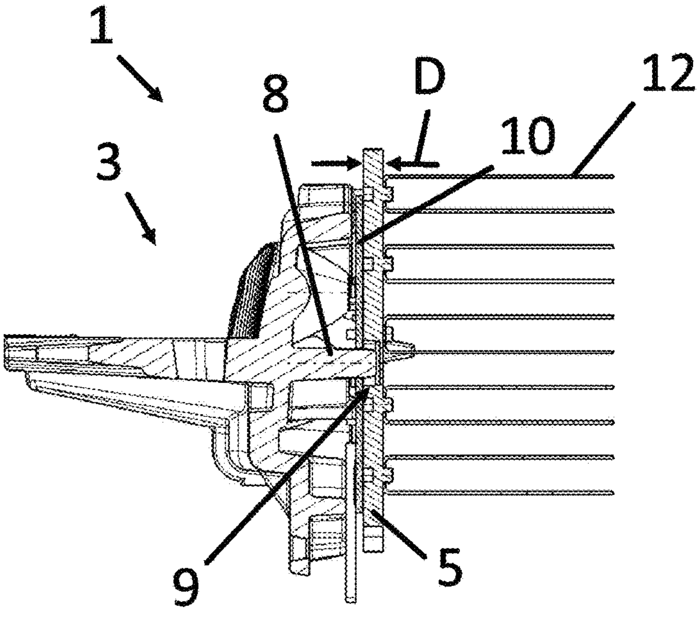
FIG. 11 shows the light module according to FIG. 6 in a sectional view according to the line XI-XI in FIG. 10.
Figure 12:
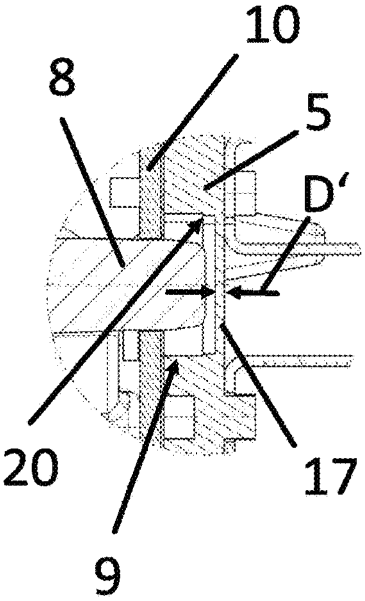
FIG. 12 shows a partial area from FIG. 11 in an enlarged view.

FIGS. 1 through 5 show a light module 1 according to internal prior art. FIGS. 6 through 12 show one embodiment of a light module 1 according to the invention.

The particular light module 1 comprises a light-generating unit 2, this light-generating unit 2 comprising a circuit board 10 with two rows of LEDs 11. The LEDs 11 are soldered to the circuit board 10. The particular light module 1 furthermore comprises an optical unit 3 designed as a primary optical unit, the optical unit 3 being used to deform the light emitted by the LEDs 11 of the light-generating unit 2. A partial area of the optical unit 3 is assigned in each case to the respective LED 11. In the present case, the optical unit 3 is made of a transparent plastic material and has a one-piece design.

The particular light module 1 comprises a heat sink 4 for cooling the light-generating unit 2, the heat sink 4 having a substantially flat cooling plate 5, the light-generating unit 2 being situated on a front side 6 of the cooling plate 5. The cooling plate 5 likewise has a one-piece design and is made of metal. Multiple cooling fins 12 are situated at the cooling plate 5, on a rear side 7 of the cooling plate 5 facing away from the optical unit 3 and the light-generating unit 2. The cooling fins 12 are likewise made of metal and are non-detachably connected to the cooling plate 5 via mechanical joining connections, thus forming the heat sink 4.

The light-generating unit 2 is situated between the optical unit 3 and the cooling plate 5. For the purpose of positioning the light-generating unit 2 at the cooling plate 5, the cooling plate 5, on its front side 6, comprises two prepositioning pins 18 protruding on the front side, and the circuit board 10 has bearing openings 19 corresponding to the prepositioning pins 18. The prepositioning pins 18 are formed by rear embossments of the cooling plate 5, and are thus an integral part of the cooling plate 5.

The optical unit 3 comprises three referencing means 8 in the form of referencing pins or positioning pegs that cooperate with corresponding countermeans or reference positionings 13 that are formed in the circuit board 10, for the purpose of exact positioning of the optical unit 3 in relation to the light-generating unit 2. In the present case, the countermeans 13 or reference positionings are designed as laterally open through openings that extend through the circuit board 10. As is apparent in particular from the sectional views in FIGS. 4 and 5 and the sectional views in FIGS. 11 and 12, the referencing means 8 cooperates with the countermeans 13 of the circuit board 10 in a form-fit manner, preferably without play.

The optical unit 3 may comprise two securing elements in the form of spring arms 15, these spring arms 15 extending through corresponding retaining structures 16 in the form of rectangular through openings in the cooling plate 5, and in the installed position cooperating with the cooling plate 5 in a latching manner.

On its front side 6 facing the optical unit 3, the cooling plate 5 of the light module 1 according to FIGS. 1 through 5 comprises multiple through openings 14 that accommodate the referencing means 8, the through openings 14 extending completely through the cooling plate 5. This is particularly apparent in FIGS. 2, 4, and 5, it being further apparent in FIGS. 4 and 5 that the through openings 14 accommodate the referencing means 8 with play. The through openings 14 result in leakage of light on the rear side 7 of the heat sink 4.

In the embodiment of the light module 1 according to the invention as illustrated in FIGS. 6 through 12, it is provided that, instead of the through openings 14, recesses 9 are provided in the cooling plate 5, these recesses 9 being closed at the rear, in contrast to the through openings 14. This is particularly apparent from the sectional views in FIGS. 11 and 12 and from the rear view in FIG. 9. The particular recess 9 is designed in the manner of a blind hole, the recess 9 having a cross-section that tapers in the direction of the rear side 7 of the cooling plate 5 along a step 20. The cooling plate 5 has a thickness D of approximately 3 mm, and a closed base 17 that delimits the recess 9 at the rear has a thickness D' of approximately 0.5 mm.

Figure 13:
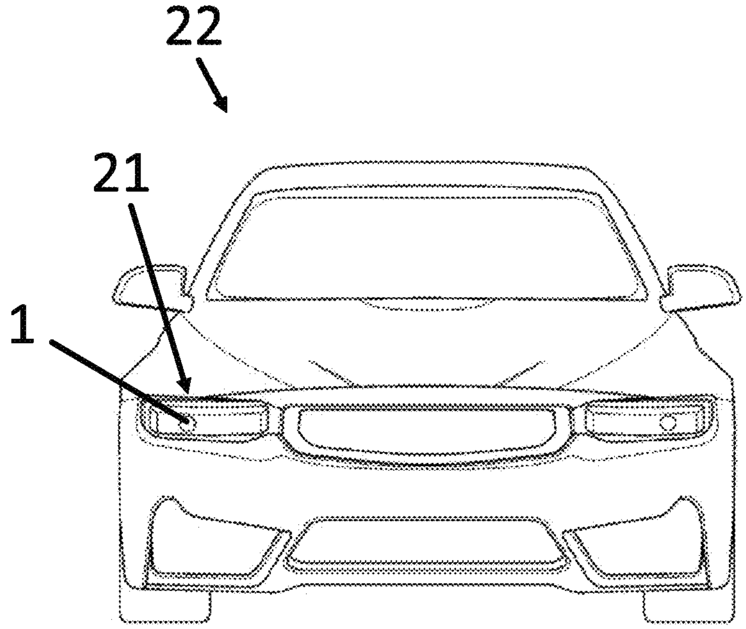
FIG. 13 shows a passenger car in a front view.

The light module 1 according to the invention, as illustrated in FIG. 13, may be an integral part of a headlight 21 of a vehicle 22, in the present case, a passenger car.

LIST OF REFERENCE SYMBOLS

1 light module
2 light-generating unit
3 optical unit
4 heat sink
cooling plate
6 front side
7 rear side
8 referencing means
9 recess
circuit board
11 LED
12 cooling fins
13 countermeans
14 through opening
spring arm
16 retaining structure
17 base
18 prepositioning pin
19 bearing opening
step
21 headlight
22 vehicle
D thickness
D' thickness

The invention claimed is:

1. A light module for a headlight of a vehicle, the light module comprising:

a light-generating unit for emitting light, the light-generating unit comprising a plurality of light emitting diodes (LEDs) disposed on a circuit board, an optical unit for deforming the light emitted by the light-generating unit, and a heat sink for cooling the light-generating unit, the heat sink comprising a flat cooling plate and a plurality of cooling fins, the flat cooling plate having a front side facing the optical unit and a rear side facing away from the optical unit, the plurality of cooling fins extending rearwardly from the rear side of the flat cooling plate, the light-generating unit being situated between the optical unit and the heat sink, the optical unit comprising at least one referencing means, the referencing means including a positioning peg extending through an opening in the circuit board of the light-generating unit to align the optical unit with the light-generating unit, the heat sink having a recess that accommodates the referencing means on the front side facing the optical unit, the recess being closed or substantially closed at the rear, the optical unit being light transmissive and further comprising first and second spring arms extending rearwardly through first and second lateral openings in the flat cooling plate and engaging the rear side of the cooling plate to removably secure the optical unit and the light-generating unit to the heat sink, the plurality of cooling fins being disposed between the first and second lateral openings in the flat cooling plate.

2. The light module according to claim 1, wherein the optical unit comprises a plurality of referencing means, and the heat sink has a plurality of recesses that accommodate the referencing means, the recesses being closed at the rear.

3. The light module according to claim 1, wherein:

the recess is closed; and the recess is designed in the manner of a blind hole.

4. The light module according to claim 1, wherein the referencing means is situated in the recess with play.

5. The light module according to claim 1, wherein the recess has a cross-section that tapers in the direction of the rear side, the recess having a cross-section that tapers in the direction of the rear side along one or more steps.

6. The light module according to claim 1, wherein a closed base that delimits the recess at the rear is an integral part of the heat sink.

7. The light module according to claim 6, wherein the closed base and a region surrounding the closed base form a flat area on the rear side of the heat sink.

8. The light module according to claim 1, wherein the cooling plate has a thickness of 1.5 mm to 5 mm, or the base has a thickness greater than or equal to 0.3 mm.

9. The light module according to claim 1, wherein the plurality of LEDs includes one or more rows of LEDs.

10. The light module according to claim 1, wherein the optical unit includes a single-piece construction, such that the at least one referencing means and the first and second spring arms are integrally formed therewith.

11. The light module according to claim 10, wherein the heat sink includes first and second pre-positioning pins protruding from the front side of the cooling plate into first and second bearing openings in the circuit board, the first and second pre-positioning pins being integrally formed with the cooling plate.

* * * * *